Dec. 23, 1952

A. MICHAUDET 2,622,623

FLEXIBLE, EXTENSIBLE, AND COMPRESSIBLE
TUBE WITH REGULAR PASSAGE SECTION

Filed Aug. 13, 1946

INVENTOR
ALFRED MICHAUDET
BY
*Richards & Geier*
ATTORNEYS

Dec. 23, 1952 A. MICHAUDET 2,622,623
FLEXIBLE, EXTENSIBLE, AND COMPRESSIBLE
TUBE WITH REGULAR PASSAGE SECTION
Filed Aug. 13, 1946 2 SHEETS—SHEET 2

INVENTOR.
ALFRED MICHAUDET
BY
Richards & Geier
ATTORNEYS

Patented Dec. 23, 1952

2,622,623

UNITED STATES PATENT OFFICE 2,622,623

FLEXIBLE, EXTENSIBLE, AND COMPRESSIBLE TUBE WITH REGULAR PASSAGE SECTION

Alfred Michaudet, Reims, Marne, France, assignor to Les Produits Du Lynx Jaune, Reims, Marne, France, a company of France Application August 13, 1946, Serial No. 690,116
In France November 25, 1933

Section 1, Public Law 690, August 8, 1946
Patent expires November 25, 1958

2 Claims. (Cl. 138—49)

The object of my invention is to provide a hose or flexible tube made of natural or artificial rubber, rubber surrogate or any other flexible material, which may be stretched, shortened and bent without the provided passage section being modified and without the geometrical shape of said section being changed.

Another object of the invention is to provide a tube which is substantially constituted by a wall made of flexible material comprising parts of a pre-determined diameter forming the so-called conduit cross-section, enlarged or narrowed parts coming in turns with the first and forming a bellows next, reinforcing elements such as clamps, clips, rings or the like, wrap the parts making the so-called conduit.

Said reinforcing elements may be realized in many manners, as to be seen farther on.

A further object of my invention is to provide such a tube, the wall of which comprises, from distance to distance, cylindrical parts which afford the possibility of fitting the tube with clamping or locking rings ensuring the tightness of connections.

The tube according to the present invention affords, besides the above mentioned properties, the advantages of saving the amount of rubber required for the manufacture of said tube due to the co-operation of said reinforcing members to the maintenance of the invariable section, and of preserving under inner or outer fall of pressure a perfect shape of the parts making the so-called conduit.

Further objects and advantages of my invention will be apparent from the description and claims.

In the drawings, in which embodiments of my invention are illustrated:

Figure 1:
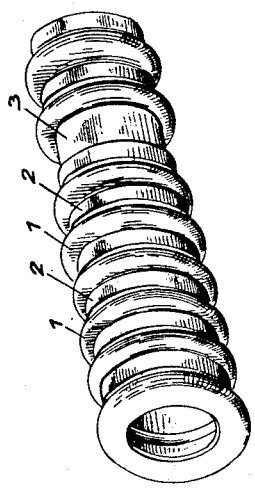
Fig. 1 is a perspective of a tube according to the invention provided with circular bellows and ribs.
Figure 2:
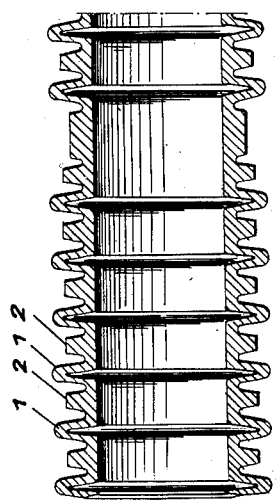
Fig. 2 is a longitudinal sectional view of the tube shown Fig. 1.

The tube (Figs. 1 to 3) is constituted by a body made of rubber or similar material comprising bellows in the shape of circular rings, such as 1, which make the tube extensible; ribs in the shape of circular rings with rectangular section such as 2 and used as reinforcement or hoops; cylindrical flat parts placed at intervals such as 3 afford the possibility of fitting the tube with clamping or locking rings ensuring the tightness of its connection with rigid pipes or nozzles.

Figure 3:
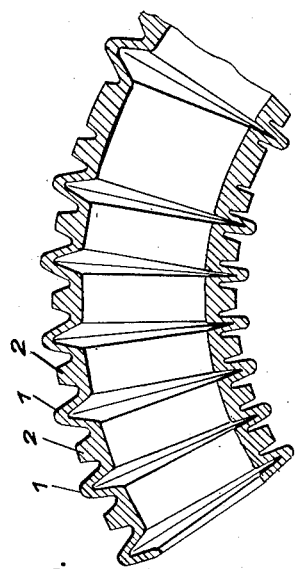
Fig. 3 shows the same tube in bended position.

The tube (Figs. 1 to 3) affords, by means of bellows 1, the possibility of stretching out or shortening, according to its axis, which particularly facilitates bending without appreciable deformation of section as shown Fig. 3. Ribs 2 stiffen the tube wall against outside pressures and preserve a perfectly circular tube section. At the bends, the ribs 2 prevent the flattening of the tube and maintain, even for small bending radius, a non-distorted section ensuring a wide passage to fluids or gas.

In spite of differences in the internal section of the tube, due to the presence of bellows, a tight connection with a rigid pipe or a rigid nozzle remains easy due to cylindrical flat parts 3 which may be surrounded with clamping or locking rings.

Numerous modifications may be made to the tube above described as an example.

Figure 4:
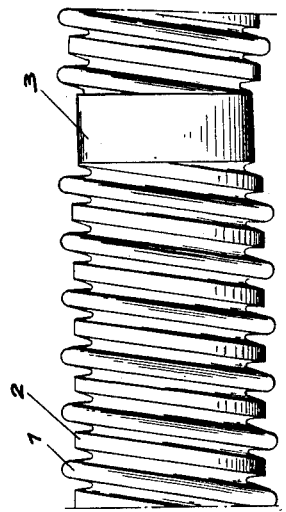
Fig. 4 shows another modification of the invention in which the bellows and rib of the tube are of helical shape.
Figure 5:
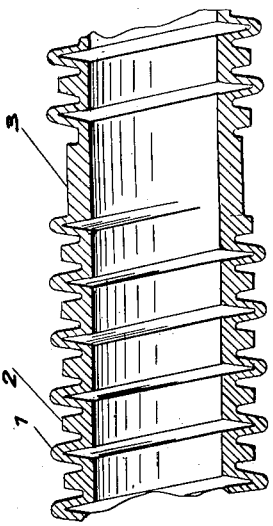
Fig. 5 is a longitudinal view of Fig. 4.

More particularly, the tube shown Figs. 4 and 5, illustrates another modification of the invention, in which 1 is a continuous accordion bellows of helical shape and 2 is a rectangular sectioned stiffening rib also of helical shape.

The helices formed by the bellows on the one hand and by the rib on the other hand, have same pitch and are displaced of 180° according to the well known arrangement of double threaded screws.

From distance to distance, cylindrical flat parts 3 are provided to ensure the tight connection of the rubber tube with rigid pipes or nozzles.

Figure 6:
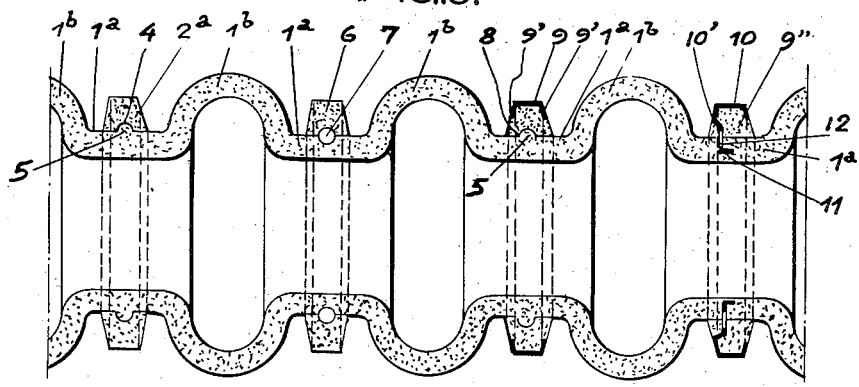
Figures 6, 7 and 8 are sectional views, each of which shows several modifications.

According to Figure 6, a tube made of rubber or other similar material comprises cylindrical parts 1ª and intermediate circular bellows 1ᵇ alternating one another.

According to a first form of execution, ribs 2ª are gathered, in course of moulding for instance, with the cylindrical parts 1ª. For instance, the rib 2ª is constituted by a rubber ring having on the inner side a circular groove 4 in which is located a circular projection 5 produced by the material of the cylindrical part 1ª. Said projection 5 is obtained, for instance, by blowing the tube in the mould, with the effect of pushing back its malleable material in the groove 4.

Rib 6 is constituted in a manner similar to rib 2ª with a ring shaped groove. Here, a closed ring of metallic wire 7 is inlaid in the groove of rib 6 and is set in the material of the cylindrical part 1ᵃ. In fact, said metallic ring is used both for reinforcing said part of the tube and for making a joint between the elements 1ᵃ and 6.

The rib 8 is constituted in a manner similar to rib 2ᵃ and also comprises a groove in which engages a projection 5 of the cylindrical part 1ᵃ. Moreover, a clamp 9 constituted by a flanged stamped metallic part 9' encircles rib 8.

Rib 9'' encircles with a cylindrical wall the cylindrical part 1ᵃ of the tube. Said rib is also encircled with a clamp 10 constituted by a stamped metallic part, wrapping said rib and having a bent up wing 10' inserted and imbedded in the rib 9 and in the material of the cylindrical wall 1ᵃ of the tube.

Clamp 10 is provided at the end of wing 10' with a rim 11 and said wing 10' is provided with port-holes 12, so that the fluid material of the tube, running through the port-holes 12 imbeds the wing 10' and the wing edge 11, which ensures a perfect anchorage of clamp 10.

Figure 7:
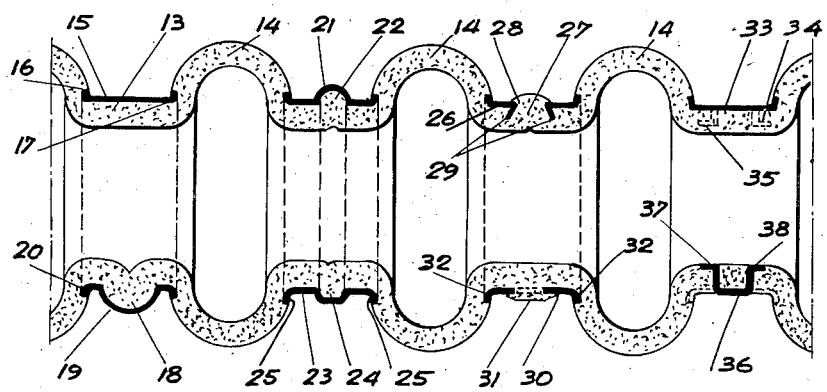

In Fig. 7, the tube is still constituted by cylindrical parts 13 and by enlargements 14 making a bellows. Here the whole length of cylindrical parts 13 is encircled by metallic clamps, say from one enlargement to the other. From left to right, the upper part of Fig. 7 shows a metallic clamp 15 of regular cylindrical shape wrapping the cylindrical part 13 of the tube and provided with two raised edges 16, 17, which are set in the base of the widening parts 14 making bellows. The cylindrical part 13 is provided with a longitudinal circular rib 18 and according to the lower part of Fig. 7, the clamp has a half-round section 19 encasing the projection 18, as well as rims 20 imbedded in the tube material.

The annular projection 21 formed upon the following upper cylindrical part of the tube is wrapped in a clamp correspondingly shaped. Likewise, clamp 23 is so stamped as to comprise a housing 24 and setting in ends 25.

Clamp 26 is provided with windows or recesses 27 into which a collar 28 is formed through hot upsetting of the tube material.

The recess edges 27 are inwardly lowered to form anchorage parts 29. Clamp 30 is of a cylindrical shape; said clamp 30 is fixed by means of a member 31 and is provided with rims 32 which are inlaid in the bellows elements 14. Ring 33 is provided with edges alternatively cut out and stamped according to their diameters, so as to reinforce the cylindrical parts of the tube. Said cylindrical parts thus withstand inner pressures according to diameter 34 and outer pressures according to diameter 35. On the under side, the clamp is constituted by a U-shaped part 36 provided at both wings with rims 37, 38 improving the maintenance therefrom when said wings are inlaid in the rubber wall of the tube.

The modifications above described are more particularly designed for conduits having to withstand outer pressures.

Figure 8:
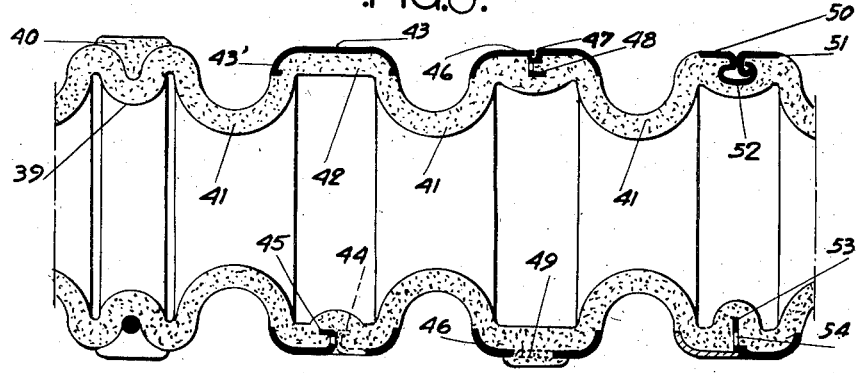

Fig. 8 shows successive forms of execution appropriate to the case of conduits having to withstand inner pressures.

Left of Fig. 8 part 39 of the tube is bent up in the shape of a V and a clamp 40 of same material is inlaid between the branches of said V. For this purpose, the bellows elements 41 are constituted by narrowings of the tube, instead of being constituted by enlargements, as shown in the preceding figures. The cylindrical parts 42 are wrapped in metallic clamps 43 the end of which properly bent are inlaid in the tube material. Clamp 43 may be provided with stamped out holes 44, the cut up metallic part being inwardly bent at 45 through which an excellent anchorage in rubber is obtained.

Likewise, clamp 46 wraps the whole cylindrical part of the tube and is provided with holes 47 the edge of which is straightened at 48 to be inlaid in the tube material. The lower part of said figure shows a perforation 49 bored in clamp 46 the lateral edges of which wrap the cylindrical part of the tube.

On the right of Fig. 8, the clamp comprises two rings 50, 51, set in one another at 52. The lower part shows an alternative of the rim 53 provided with holes 54 through which flows the fluid material of the tube by means of which the clamp is tightly anchored.

A flexible tube comprising cylindrical parts connected through enlarged or narrowed parts making a bellows has been described. The features of the invention illustrated in Figures 6–8 also apply to a flexible tube provided with a helical part of a given diameter, making the so-called conduit, and with an enlarged or narrowed helical part making the bellows, the spirals of the first part coming in turn with the spirals of the second part. In this case, the above described clamps and their various modifications should be constituted by a continuous band, also helical, encircling the tube part making the so-called conduit while maintaining and reinforcing said part.

The clamps, collars, rings, or belts, according to the invention, may be mounted in various manners. For instance, said clamps or similar members may be arranged in recesses provided for the purpose in the mould in which the tube is to be moulded, or else they may be set upon the latter afterwards. The clamps, for instance, may be provided with fastening members which may be fastened and loosened by means of suitable tools such as pliers.

The so-called tube may be made of natural or synthetic rubber or of any other flexible material. The helical clamps, collars, rings or belts used for reinforcement or support may be made of metal or of plastic material.

The tubes according to the invention may be used for many purposes, viz. as conduits for any kind of products, conduits for fluids under pressure, vacuum conduits, as well as for making the body of various articles such as grease guns, syringes, pulverizers, pumps and other similar apparatuses.

Further modifications will be apparent to those skilled in the art and it is desired, therefore, that the invention be limited only by the prior art and the scope of the appended claims.

Having thus described my invention, what I claim and desire to secure by Letters Patent is:

1. A tube made of flexible material, comprising in alternation axially spaced stiffening ribs and inwardly open, accordion-shaped, outwardly projecting parts adapted to act after the manner of bellows and having internal cavities, the walls of said cavities being V-shaped in cross section, the apices of the walls of said cavities extending outwardly to be at least in alinement with the outer periphery of said stiffening ribs.

2. A tube made of flexible material, comprising in alternation a helical stiffening rib and inwardly open, accordion-shaped, outwardly projecting parts adapted to act after the manner of bellows, said parts being helically inserted between said stiffening helical ribs and having internal cavities, the walls of said cavities being V-shaped in cross section, the apices of the walls of said cavities extending outwardly, to be at least in alinement with the outer periphery of said stiffening ribs.

ALFRED MICHAUDET.

REFERENCES CITED

The following references are of record in the file of this patent:

UNITED STATES PATENTS

| Number | Name | Date |
|---|---|---|
| 2,073,335 | Connell | Mar. 9, 1937 |
| 2,330,651 | Welger | Sept. 28, 1943 |

FOREIGN PATENTS

| Number | Country | Date |
|---|---|---|
| 303,856 | Italy | Dec. 19, 1932 |
| 569,929 | Germany | Mar. 8, 1930 |
| 792,910 | France | Jan. 13, 1936 |
| 828,983 | France | June 7, 1938 |